(12) United States Patent
Yone et al.

(10) Patent No.: US 7,454,992 B2
(45) Date of Patent: Nov. 25, 2008

(54) VEHICULAR MANUAL TRANSMISSION CONTROL APPARATUS

(75) Inventors: Shinichi Yone, Wako (JP); Ken Shibazaki, Tokyo (JP)

(73) Assignees: Honda Motor Co., Ltd., Tokyo (JP); Alps Electric Co., Ltd., Tokyo (JP)

( * ) Notice: Subject to any disclaimer, the term of this patent is extended or adjusted under 35 U.S.C. 154(b) by 282 days.

(21) Appl. No.: 10/568,895

(22) PCT Filed: Aug. 9, 2004

(86) PCT No.: PCT/JP2004/011718

§ 371 (c)(1),
(2), (4) Date: Feb. 17, 2006

(87) PCT Pub. No.: WO2005/019702

PCT Pub. Date: Mar. 3, 2005

(65) Prior Publication Data
US 2006/0236800 A1    Oct. 26, 2006

(30) Foreign Application Priority Data
Aug. 21, 2003    (JP) .............................. 2003-298034

(51) Int. Cl.
*F16H 59/00*    (2006.01)
*F16H 61/00*    (2006.01)
*F16H 63/00*    (2006.01)

(52) U.S. Cl. .................... 74/335; 74/473.12; 200/61.28

(58) Field of Classification Search .............. 200/61.28, 200/61.88, 61.91
See application file for complete search history.

(56) References Cited

U.S. PATENT DOCUMENTS

| 7,069,801 | B2 * | 7/2006 | Yone ............................ 74/335 |
| 7,104,152 | B2 * | 9/2006 | Levin et al. ............. 74/471 XY |
| 7,327,241 | B2 * | 2/2008 | Toda et al. ................... 340/438 |
| 2002/0157492 | A1 | 10/2002 | Hayashi et al. |
| 2003/0172757 | A1 | 9/2003 | Yone |
| 2007/0017312 | A1 * | 1/2007 | Yone ............................ 74/335 |

FOREIGN PATENT DOCUMENTS

DE    199 20 650 A1    11/2000
WO    WO 02/33290 A1    4/2002

* cited by examiner

*Primary Examiner*—David D. Le
(74) *Attorney, Agent, or Firm*—Rankin, Hill & Clark LLP

(57) ABSTRACT

Vehicular manual transmission control apparatus is of the type in which two or more selectable shift positions of a shift lever (13) can be varied on the basis of a travel control state (e.g., position of the shift lever) of the vehicle. The apparatus includes a guide section (various shift patterns), which allows shift operation of the shift lever along a given shift path, assigned a high selection priority, to be performed with ease when the lever is to be shifted to a desired one of the shift positions. The guide section is implemented by a reactive force generation mechanism (41) which is in turn implemented by a control device (26).

15 Claims, 5 Drawing Sheets

VEHICULAR MANUAL TRANSMISSION CONTROL APPARATUS

TECHNICAL FIELD

The present invention relates to a vehicular manual transmission control apparatus and, more particularly, to a vehicular manual transmission control apparatus designed to enhance operability of and prevent erroneous operation of a manual shift lever in performing shifts along an H-shaped shift pattern or the like.

BACKGROUND ART

Transmission control apparatus for vehicles, such as passenger cars, are generally classified into two major types, automatic transmission control apparatus and manual transmission control apparatus. In the automatic transmission control apparatus, a gear change can be made during travel of the vehicle by a human driver only moving or shifting a shift lever linearly to set the shift lever in a designated position ("D" range). In the manual transmission control apparatus, where there is provided an H-shaped shift pattern comprising shift paths connecting a plurality of shift positions corresponding to various speed levels, a gear change can be made by the driver manually manipulating the transmission shift lever to move the lever along shift paths to an appropriate one of the shift positions. Clutch is kept in an OFF state while speed change operation is being performed via the manual transmission control apparatus during travel of the vehicle. Further, the conventionally-known vehicular transmission control include those where the above-mentioned two types of transmission control apparatus can be used selectively as well as in combination.

Japanese Patent Laid-Open Publication No. 2002-257222 is named here as disclosing a technique relevant to the present invention. Specifically, this publication discloses a structure for forestalling possible erroneous operation in a transmission shift device. When the shift lever is set, for example, in the drive (D) range of the automatic transmission control apparatus, this transmission shift device functions to disable shift operation via a control mechanism virtually creating a repulsive resistance even if the driver tries to move the shift lever from the drive (D) range to another range, such as an "N" or "R" range, as long as a detected vehicle velocity satisfies a particular condition. The transmission shift device thus arranged can prevent the driver from performing erroneous operation.

In the conventional vehicular manual transmission control apparatus, it has been necessary for the driver to move the shift lever from a given shift position, along the shift paths forming the H-shaped shift pattern, to another desired shift position. The shift paths forming the H-shaped shift pattern have a mechanical structure, and they are in the form of guide grooves to impart mechanical restrictions or limitations to shifting movement of the shift lever. In recent years, a new type of device has been proposed for use in the manual transmission control apparatus, which is arranged to vary the structure of the H-shaped shift pattern in a finished vehicle in accordance with a request of the driver. Specifically, the proposed device is constructed to provide the H-shaped shift pattern by generating and imparting a load, i.e. reactive force, to the shift lever via electric/electronic control means, rather than mechanically providing the H-shaped shift pattern that functions to guide movement of the shift lever to set the shift lever in a desired shift position.

In the case where the H-shaped shift pattern is virtually provided in the vehicular manual transmission control apparatus by the electric/electronic control means generating a load (reactive or restrictive force) as noted above, it is possible to produce various other loads through various control schemes and thereby further enhance the function of the manual transmission control apparatus.

The above-mentioned technique applied to the manual transmission control apparatus for virtually generating a load or reactive force via the electric/electronic control means so as to impart the driver, manipulating the shift lever, with a pseudo force acting on the driver's sense of touch is commonly known as the "haptic" technique. In effect, the "haptic" technique is one of various techniques for interfacing with computers and is intended to create an interactive relationship between a human and a machine through the sense of touch or feel.

DISCLOSURE OF THE INVENTION

The present invention seeks to provide a technique which is suitably applicable to a vehicular manual transmission apparatus where an H-shaped shift pattern and/or the like is virtually created, via electric/electronic control means, to achieve enhanced changeability and flexibility of the shift pattern, and which can use the haptic technique to enhance the operability (operating ease) of the shift lever guided along shift paths, formed in the predetermined shift pattern, and more reliably prevent erroneous operation of the shift lever.

Namely, it is an object of the present invention to provided a vehicular manual transmission apparatus which can enhance the operability of the shift lever in an H-shaped shift pattern and/or the like, facilitate manipulation of the shift lever, assist the driver in making more reliable judgments and more reliably prevent erroneous operation of the shift lever.

In order to accomplish the above-mentioned object, the present invention provides a vehicular manual transmission control apparatus comprising: a setting means for setting a shift pattern of a transmission shift lever on the basis of a travel control state of a vehicle, wherein the shift pattern has at least one shift position; and a guide section for, when the shift lever is to be shifted to a desired position in the shift pattern having two or more shift positions, permitting a shift operation of the shift lever along shift paths with a selection priority.

In this arrangement, an H-shaped shift pattern and/or the like is created virtually and in a pseudo manner using the haptic technique. When the transmission shift lever is to be shifted in accordance with the shift pattern, the shift paths for guiding the shift lever are prioritized such that any of the shift paths having a high selection priority is varied in shape as gates, and thus a given reactive or restrictive force is produced by the haptic technique so as to facilitate shifting operation of the shift lever along a given one of the shift paths. In this way, a shift lever guide section is provided in a pseudo manner, to achieve facilitated shift operation of the shift lever. At the same time, the virtually-created reactive force is used to restrict the shift lever from being shifted toward an undesired shift destination, so that erroneous operation of the shift lever can be prevented reliably.

Desirably, the guide section takes the form of virtually-set shift path defining gates, and given roundedness is provided along a corner portion of a shift-path bifurcation area leading toward a particular shift path to which the shift lever is to be shifted. With this arrangement, shapes of the shift path defining gates and given corner portion of the shift-path bifurcation area are set in a pseudo manner by a reactive force generation mechanism based on the haptic technique. Therefore, in the H-shaped shift pattern, a reactive force to be applied to the bifurcation area pertaining to one selectable shift position is set to be different from a reactive force to be applied to another bifurcation area pertaining to another selectable shift position. In this way, driver's manual operation of the shift lever is subjected to some restriction; thus, the shift lever can be shifted easily to a suitable shift position assigned a high selection priority, while the shift lever can be prevented from being shifted to an unsuitable shift position (to which the shift lever should not be shifted) so as to avoid erroneous operation of the shift lever.

Preferably, the guide section takes the form of a reactive force element that permits or restricts shifting of the shift lever when the shift lever is to be shifted. According to the haptic technique, the reactive force generation mechanism virtually imparts loads to driver's shifting operation via the shift lever, so as to set shift paths along which the shift lever can be shifted easily and shift paths along which the shift lever can not be shifted easily. In this way, permitting and restricting conditions for operation of the shift lever can be set in a pseudo manner.

In a preferred form, the travel control state of the vehicle is a shift position of the shift lever. Generally, in the manual transmission control apparatus, shift positions, such as those corresponding to first- and second-speeds, of the shift lever are set in the H-shaped shift pattern. In the manual transmission control apparatus of the present invention, the shift pattern is determined in dependence on an initial shift position of the shift lever.

The travel control state of the vehicle may be a velocity of the vehicle.

Namely, according to the vehicular manual transmission control apparatus of the present invention, where the two or more shift positions of the transmission shift lever selectable using an H-shape shift pattern, can be varied on the basis of a travel control state of the vehicle and which comprises the guide section for facilitating shift operation of the shift lever along a given shift path assigned a high selection priority, it is possible to positively set shift operation of the shift lever in accordance with a traveling state of the vehicle and thereby prevent erroneous operation of the shift lever.

Further, according to the present invention, the roundedness provided along the corner portions of the shift-path bifurcation areas of the shift-path defining gates, constituting the guide section, is varied in accordance with an initial shift position of the shift lever, which enhances the operability of the shift lever when the shift lever is to be shifted in an oblique direction.

Further, the present invention can significantly enhance the operability of the shift lever shifted along the H-shaped shift pattern or the like, facilitate manipulation of the shift lever, assist the driver in making more reliable judgments and more reliably prevent erroneous operation of the shift lever.

BEST MODE FOR CARRYING OUT THE INVENTION

Preferred embodiments of the present invention will hereinafter be described with reference to the accompanying drawings.

Figure 1:
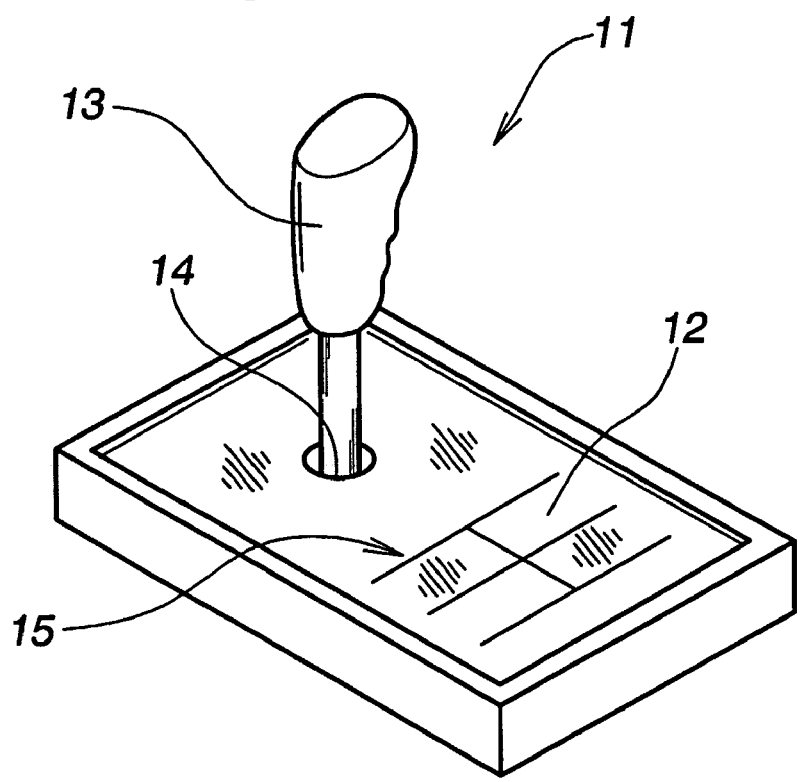
FIG. 1 is schematic perspective view of a monitor and shift lever in a manual speed-changing operation section.

Vehicular manual transmission control apparatus according to an embodiment of the present invention includes a manual speed-changing operation section 11 as illustrated in FIG. 1. The manual speed-changing operation section 11 includes a shift lever 13, and a monitor 12 disposed near the shift lever 13. The manual speed-changing operation section 11 has a hole 14 in which the shift lever 13 is inserted and supported. The shift lever 13 can be shifted on the basis of line patterns 15 visually displayed on an operation panel of the monitor 12. Center of the monitor 12 represents a neutral (N) position.

Figure 2:
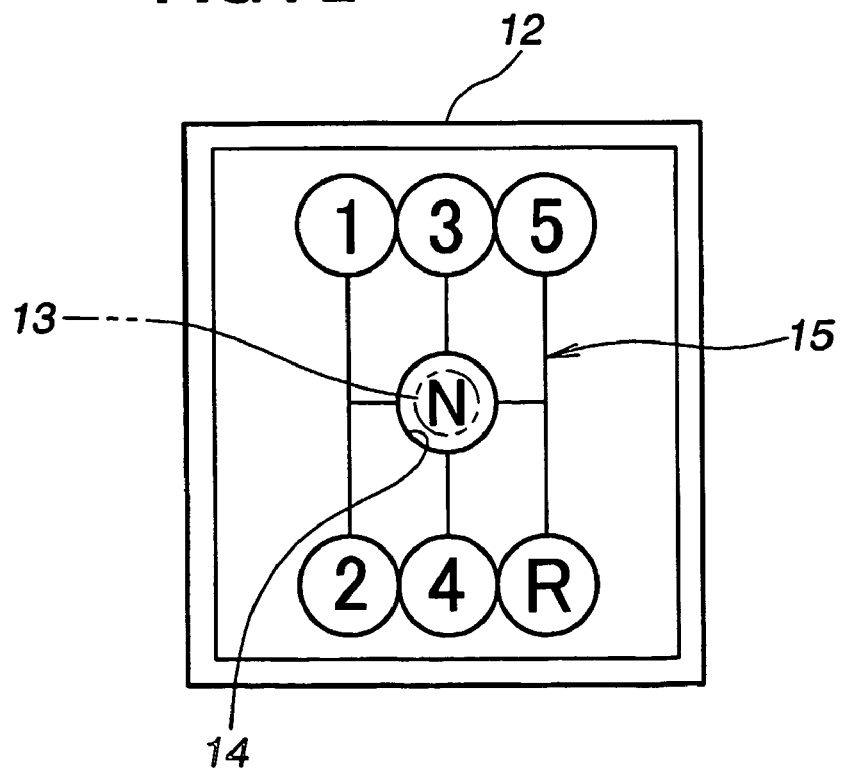
FIG. 2 is a diagrammatic view illustrating an H-shaped shift pattern for transmission visually displayed on an operation panel of the monitor.

As illustrated in FIG. 2, the line patterns 15 displayed on the operation panel of the monitor 12 are manual transmission shift patterns which comprise a first H-shaped shift pattern including shift positions corresponding to first to fourth speeds and a second H-shaped shift pattern including shift positions corresponding to third, fourth and fifth speeds and rear (R) shift position. In FIG. 2, "1"-"5" are the numbers of the respective transmission levels, "N" the neutral position, and "R" the rear travel position. Any of these numbers and alphabetical letters is each illuminated to indicate a current position of the shift lever. The line patterns 15 displayed on the operation panel of the monitor 12 constitute variable manual transmission shift patterns that can be varied as necessary, as will be later described in detail.

Now, with reference to FIGS. 3 and 4, a description will be given about an overall system setup of the embodiment of the vehicular manual transmission control apparatus.

Figure 3:
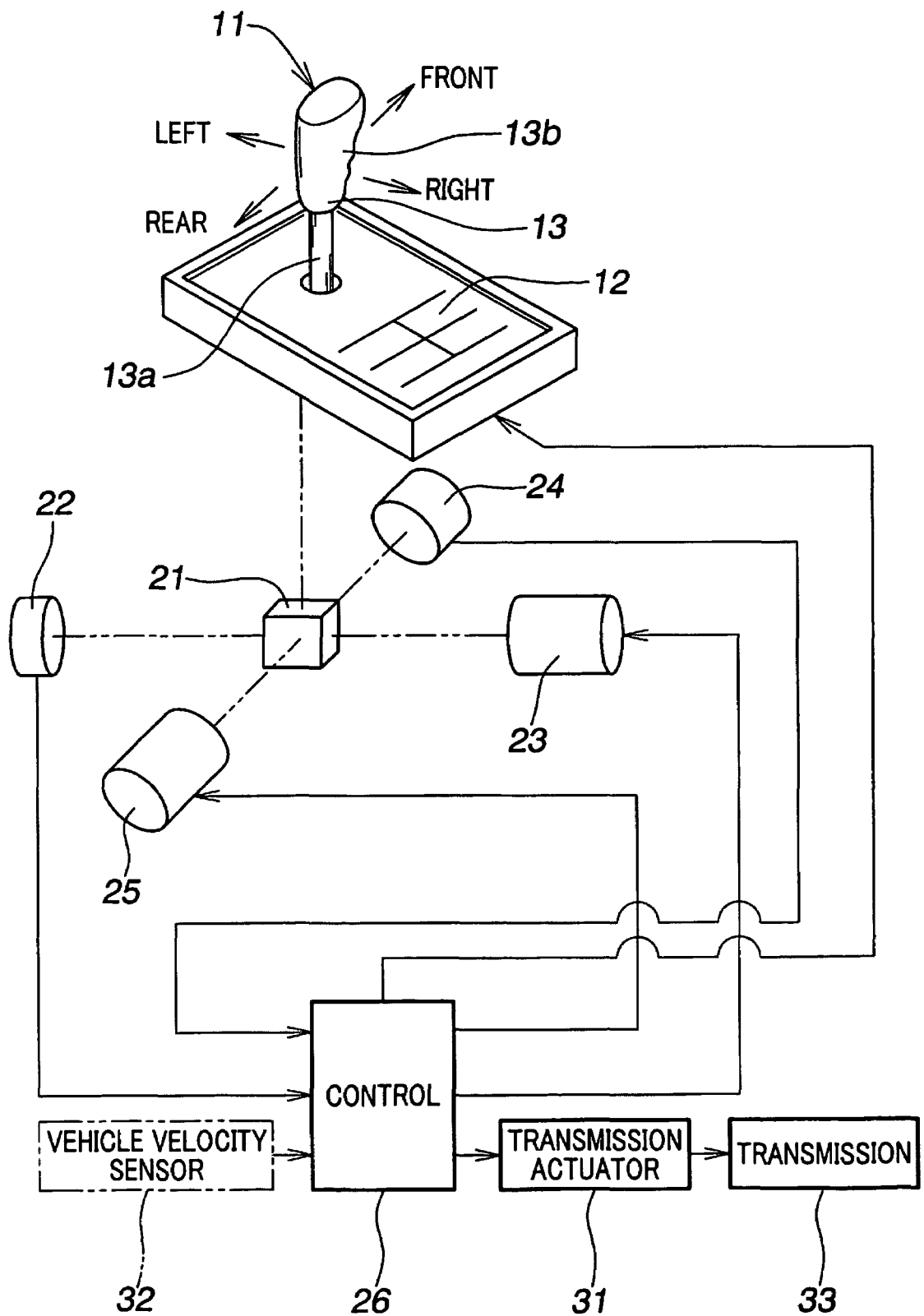
FIG. 3 is a view illustrating a general system setup of a manual transmission control apparatus in accordance with an embodiment of the present invention.
Figure 4:
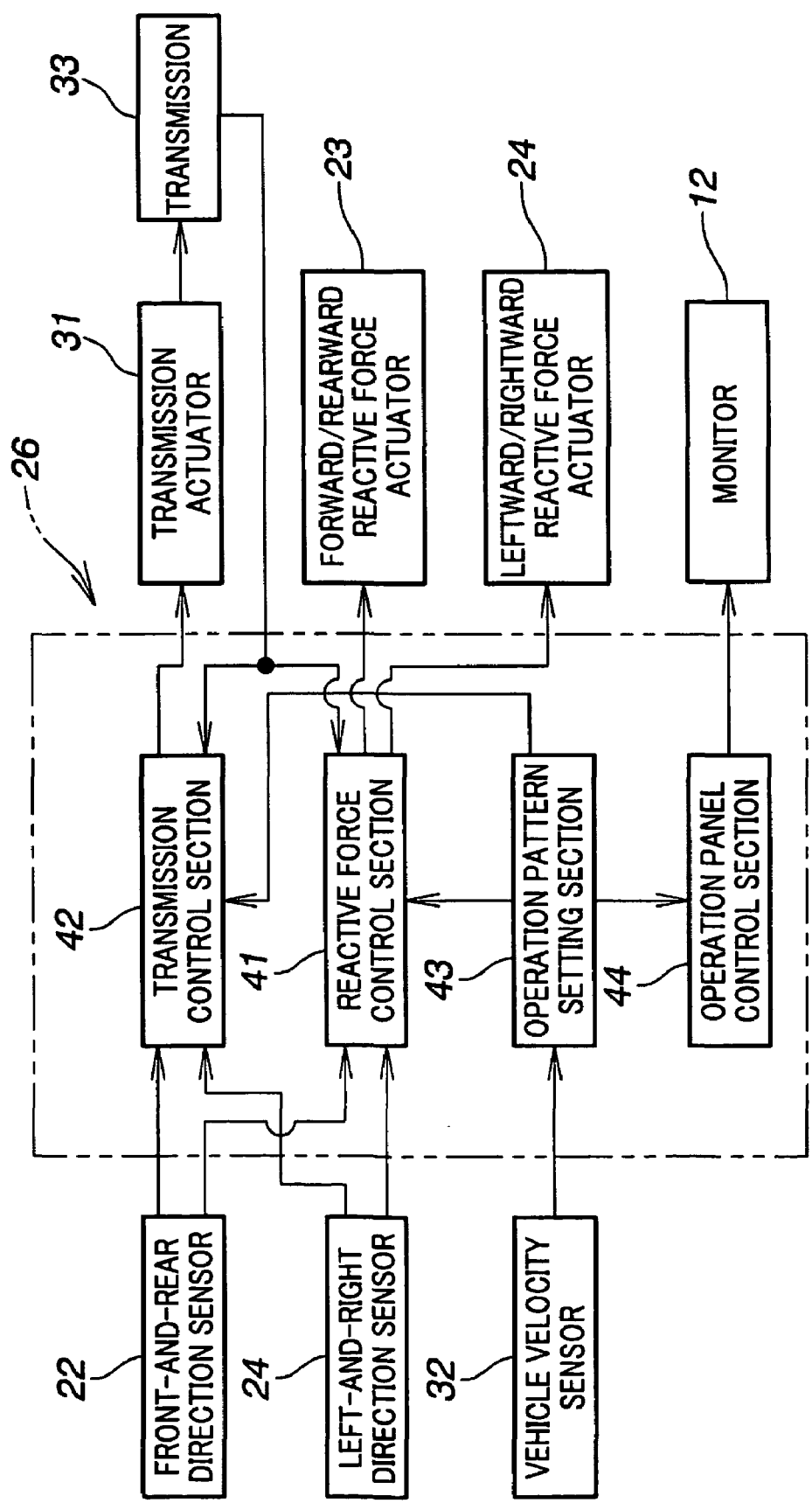
FIG. 4 is a block diagram showing an example construction of a control device and components pertaining thereto.

In FIG. 3, the shift lever 13 provided in the manual speed-changing operation section 11 can be set in any desired one of the shift positions of the above-mentioned first and second H-shaped shift patterns by being shifted in any of front-and-rear and left-and-right directions. The shift lever 13 is coupled to a tilt support mechanism 21 supporting the shift lever 13 in such a manner that the shift lever 13 can be freely tilted in the front-and rear and left-and-right directions.

The tilt support mechanism 21 includes a front-and-rear direction sensor 22 for detecting driver's manipulation, in the front-and-rear direction, of the shift lever 13, and a forward/rearward reactive force actuator 23 for imparting a reactive force (load) to the shifting movement of the shift lever 13. Also, the tilt support mechanism 21 includes a left-and-right direction sensor 24 for detecting driver's manipulation, in the left-and-right direction, of the shift lever 13, and a leftward/rightward reactive force actuator 25 for imparting a reactive force (load) to the movement of the shift lever 13. Intensity and direction of each of the reactive force in the front-and-rear and left-and-right directions is set by a control device 26. Shift operation along the line patterns 15, displayed on the operation panel of the monitor 12, can be performed on the basis of a combination of driver's manipulation, in the front-and-rear and left-and-right directions, of the shift lever 13.

The shift lever 13 is located near the driver's seat. The shift lever 13 has an operating grip 13b secured at the upper end of a pipe-shaped sticklike body 13a. Lower end portion of the pipe-shaped sticklike body 13a is supported by the tilt support mechanism 21 in such a manner that the shift lever 13 is tiltable in the front-and-rear and left-and-right directions. Amounts of driver's operation for tilting the shift lever 13 the front-and-rear and left-and-right directions are detectable by the front-and-rear direction sensor 22 and left-and-right direction sensor 24, each in the form of a potentiometer, as electrical detection signals. The detection signals of the front-and-rear direction sensor 22 and left-and-right direction sensor 24 are input to the control device 26.

The above-mentioned monitor 12 is a small-thickness monitor, such as a liquid crystal display, and located near the shift lever 13. The monitor 12 visually displays an image of the operation panel set via the control device 26. On the thus-displayed or visualized operation panel, there are displayed the line patterns 15 variable in accordance with given conditions, as noted earlier. Note that the monitor 12 may be provided on a meter panel section having various meters provided thereon.

The control device 26 comprises a computer, drive circuit, etc. The control device 26 receives the output signals from the front-and-rear direction sensor 22 and left-and-right direction sensor 24 after conversion into digital representation, performs a predetermined process on the received signals, and thereby outputs drive signals for driving a transmission actuator 31, reactive force actuator 23, forward/rearward reactive force actuator 23, leftward/rightward reactive force actuator 25 and monitor 12 under predetermined control. Information representative of a shift position of the shift lever 13 can be derived from a combination of the output signals from the front-and-rear direction sensor 22 and left-and-right direction sensor 24. Signal representative of a vehicle velocity, generated by a vehicle velocity sensor 32, is also input to the control device 26. As illustrated in FIG. 4, the control device 26 includes a reactive force control section 41, a transmission control section 42, an operation pattern setting section 43, and an operation panel control section 44.

The transmission actuator 31 appropriately controls a transmission (speed regulator) 33 on the basis of a control signal supplied by the control device 26. In this way, there is provided a shift-by-wire transmission system, so that the shift lever 13 and transmission 33 are mechanically separated instead of being mechanically connected with each other.

On the basis of the detected shift position of the shift lever 13 or vehicle velocity information from the vehicle velocity sensor 32, the operation pattern setting section 43 outputs control signals to the reactive force control section 41, transmission control section 42 and operation panel control section 44. On which of the shift position of the shift lever 13 and vehicle velocity information from the vehicle velocity sensor 32 the control signals should be based may be chosen as appropriate. The line patterns 15, defining shift operation of the shift lever 13, are displayed on the operation panel of the monitor 12 under control of the operation panel control section 44.

The reactive force control section 41 sets a reactive force corresponding to the shift position of the shift lever 13 and shift paths on the operation panel set by the operation pattern setting section 43, and the thus-set reactive force is delivered to the shift lever 13 via the forward/rearward reactive force actuator 23, leftward/rightward reactive force actuator 25. With a given reactive force thus generated by the reactive force control section 41, a guide means or guide section for permitting or restricting shift operation is provided virtually or in a pseudo manner in accordance with the shift position of the shift lever 13 or vehicle velocity. The guide section functions as gates for defining shift paths of the shift lever 13. Shift path patterns defined by the guide section will be later described in detail.

On the basis of the shift position of the shift lever 13 on the operation panel of the monitor 12 set by the operation pattern setting section 43, the transmission control section 42 controls the transmission actuator 31 that changes gears of the transmission 33. As the shift lever 13 is moved, for example, to the third-speed shift position in accordance with the line patterns 15 on the operation panel of the monitor 12 of FIG. 2, the front-and-rear direction sensor 22 and left-and-right direction sensor 24 detect respective amounts of operation in the front-and-rear direction and left-and-right direction, and the thus-detected operation amounts are input to the transmission control section 42. Note that the line patterns 15 for manual transmission or shift path patterns, displayed on the operation panel of the monitor 12, have been set by the operation pattern setting section 43. Under such circumstances, the transmission control section 42 varies the gear condition of the transmission 33 in accordance with the current shift position of the shift lever 13, on the basis of a signal representative of the manual transmission patterns supplied from the operation pattern setting section 43 and the signals from the front-and-rear direction sensor 22 and left-and-right direction sensor 24.

Next, functional features achieved by the vehicular manual transmission apparatus arranged in the above-described manner will be described with reference to FIGS. 5 and 6.

In the instant embodiment of the vehicular manual transmission apparatus, the line patterns 15 for manual transmission or shift path patterns for the shift lever 13, displayed on the operation panel of the monitor 12, are set appropriately on the basis of the reactive force control section 41 of the control device 26. The following shift patterns for the shift lever 13 form shift path defining gates (guide means) that are in turn defined with two imaginary axes extending in the front-and-rear direction and left-and-right direction.

Figure 5:
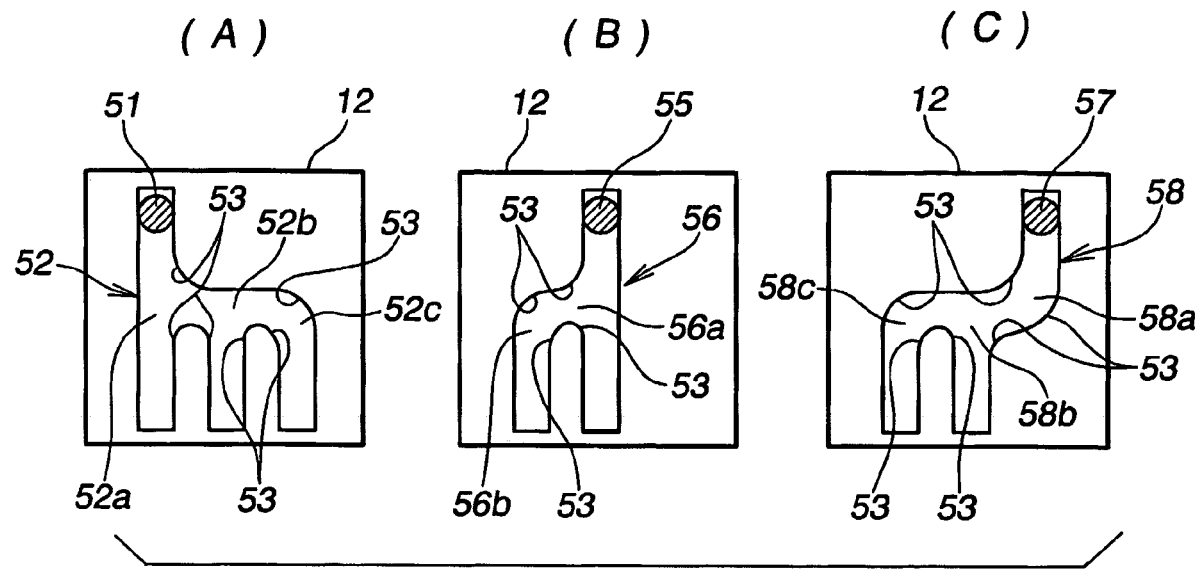
FIG. 5 is a view explanatory of virtual shift patterns corresponding to respective initial shift positions of the shift lever.

Part (A) of FIG. 5 shows an example of a shift pattern when the shift lever 13 is in the first-speed shift position 51. This shift pattern 52 is a guide pattern (guide means) defining shift paths along which the shift lever 13 can be shifted from the initial first-speed shift position 51 to the second-speed, fourth-speed and R shift positions. Therefore, according to the shift pattern 52, the shift lever 13 can be shifted from the first-speed shift position 51 to any desired one of the second-speed, fourth-speed and R shift positions, but can not be shifted to any of the third-speed and fifth-speed shift positions. Further, each of corner portions of bifurcation areas 52a, 52b and 52c in the shift paths, constituting the shift pattern 52, is formed to have some roundedness 53, so that operation for shifting the shift lever 13 to any one of the second-speed, fourth-speed and R shift positions can be performed with ease. Particularly, the corner portion of the bifurcation area leading toward the R shift position has greater roundedness. The shift pattern 52 is created, as a guide section for the shift lever 13, by the reactive force control section 41 on the basis of a predetermined condition, i.e. initial shift position of the shift lever 13.

Part (B) of FIG. 5 shows an example of a shift pattern when the shift lever 13 is in the third-speed shift position 55. This shift pattern 56 is a guide pattern (guide means) defining shift paths along which the shift lever 13 can be shifted from the initial third-speed shift position 55 to the second-speed and fourth-speed shift positions. Therefore, according to the shift pattern 56, the shift lever 13 can be shifted from the third-speed shift position 55 to any desired one of the second-speed and fourth-speed shift positions, but can not be shifted to any of the first-speed, fifth-speed and R shift positions. Further, each of corner portions of bifurcation areas 56a and 56b, leading toward the second-speed shift position in the shift paths, constituting the shift pattern 56, is formed to have some roundedness 53, so that operation for shifting the shift lever 13 to the second-speed shift position can be performed with ease. The shift pattern 56 is created, as a guide section for the shift lever 13, by the reactive force control section 41 on the basis of a predetermined condition, i.e. initial shift position of the shift lever 13.

Part (C) of FIG. 5 shows an example of a shift pattern when the shift lever 13 is in the fifth-speed shift position 57. This shift pattern 58 is a guide pattern (guide means) defining shift paths along which the shift lever 13 can be shifted from the initial fifth-speed shift position to the second-speed and fourth-speed shift positions. Therefore, according to the shift pattern 58, the shift lever 13 can be shifted from the fifth-speed shift position to any desired one of the second-speed and fourth-speed shift positions, but can not be shifted to any of the first-speed, third-speed and R shift positions. Further, each of corner portions of bifurcation areas 58a, 58b and 58c in the shift paths, constituting the shift pattern 58, is formed to have some roundedness 53, so that operation for shifting the shift lever 13 to the second-speed or fourth-speed shift positions can be performed with ease. The shift pattern 58 is created, as a guide section for the shift lever 13, by the reactive force control section 41 on the basis of a predetermined condition, i.e. initial shift position of the shift lever 13.

The shift patterns 52, 56 and 58 of the shift lever 13 shown in FIG. 5 are just illustrative, and they may be set as desired by the human driver.

Figure 6:
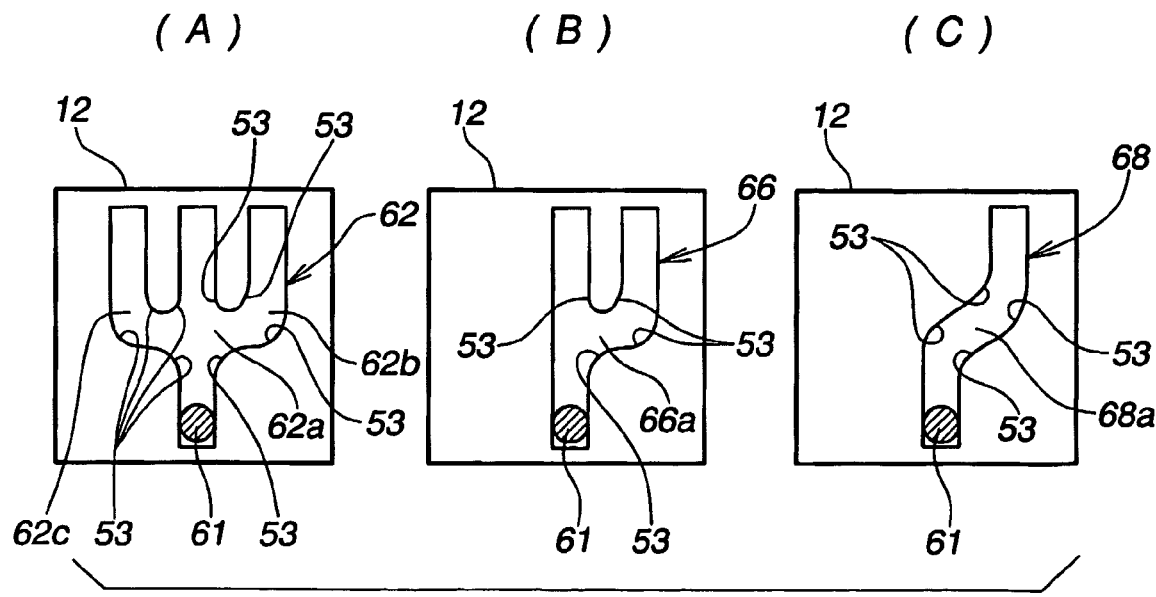
FIG. 6 is a view explanatory of virtual shift patterns corresponding to vehicle velocities.

Part (A) of FIG. 6 shows an example of a shift pattern when the shift lever 13 is, for example, in the fourth-speed shift position 61 and the vehicle is traveling at a relatively low velocity. This shift pattern 62 is a guide pattern (guide means) defining shift paths along which the shift lever 13 can be shifted from the initial fourth-speed shift position to the first-speed, third-speed and fifth-speed shift positions. Therefore, the shift lever 13 can be shifted from the fourth-speed shift position to any desired one of the first-speed, third-speed and fifth-speed shift positions, but can not be shifted to any of the second-speed and R shift positions. Further, each of corner portions of bifurcation areas 62a, 62b and 62c in the shift paths, constituting the shift pattern 62, is formed to have some roundedness 53, so that operation for shifting the shift lever 13 to any one of the first-speed, third-speed and fifth-speed shift positions can be performed with ease. The shift pattern 62 is created, as a guide section for the shift lever 13, by the reactive force control section 41 on the basis of a predetermined condition, i.e. initial shift position of the shift lever 13.

Part (B) of FIG. 6 shows an example of a shift pattern when the shift lever 13 is, for example, in the fourth-speed shift position 61 and the vehicle is traveling at a velocity in the medium/high velocity range. This shift pattern 66 is a guide pattern (guide means) defining shift paths along which the shift lever 13 can be shifted from the initial fourth-speed shift position to the third-speed and fifth-speed shift positions. Therefore, according to the shift pattern 66, the shift lever 13 can be shifted from the fourth-speed shift position to any desired one of the third-speed and fifth-speed shift positions, but can not be shifted to any of the first-speed, second-speed and R shift positions. Further, a corner portion of a bifurcation area 66a in the shift paths, constituting the shift pattern 66, is formed to have some roundedness 53, so that operation for shifting the shift lever 13 to the fifth-speed shift position or the like can be performed with ease. The shift pattern 66 is created, as a guide section for the shift lever 13, by the reactive force control section 41 on the basis of a predetermined condition, i.e. initial shift position of the shift lever 13.

Part (C) of FIG. 6 shows another example of a shift pattern when the shift lever 13 is, for example, in the fourth-speed shift position 61 and the vehicle is traveling at a velocity in a different medium/high velocity range higher than the above-mentioned velocity range discussed in relation to Part (B) of FIG. 6. This shift pattern 68 is a guide pattern (guide means) defining shift paths along which the shift lever 13 can be shifted from the initial fourth-speed shift position to the fifth-speed shift position. Therefore, according to the shift pattern 68, the shift lever 13 can be shifted from the fourth-speed shift position to the fifth-speed shift position, but can not be shifted to any of the first-speed, second-speed, third-speed and R shift positions. Further, a corner portion of a bifurcation area 68a in the shift paths, constituting the shift pattern 68, is formed to have some roundedness 53, so that operation for shifting the shift lever 13 to the fifth-speed shift position can be performed with ease. The shift pattern 68 is created, as a guide section for the shift lever 13, by the reactive force control section 41 on the basis of a predetermined condition, i.e. initial shift position of the shift lever 13.

The shift patterns 62, 66 and 68 of the shift lever 13 shown in FIG. 6 are just illustrative, and they may be set as desired by the human driver.

Figure 7:
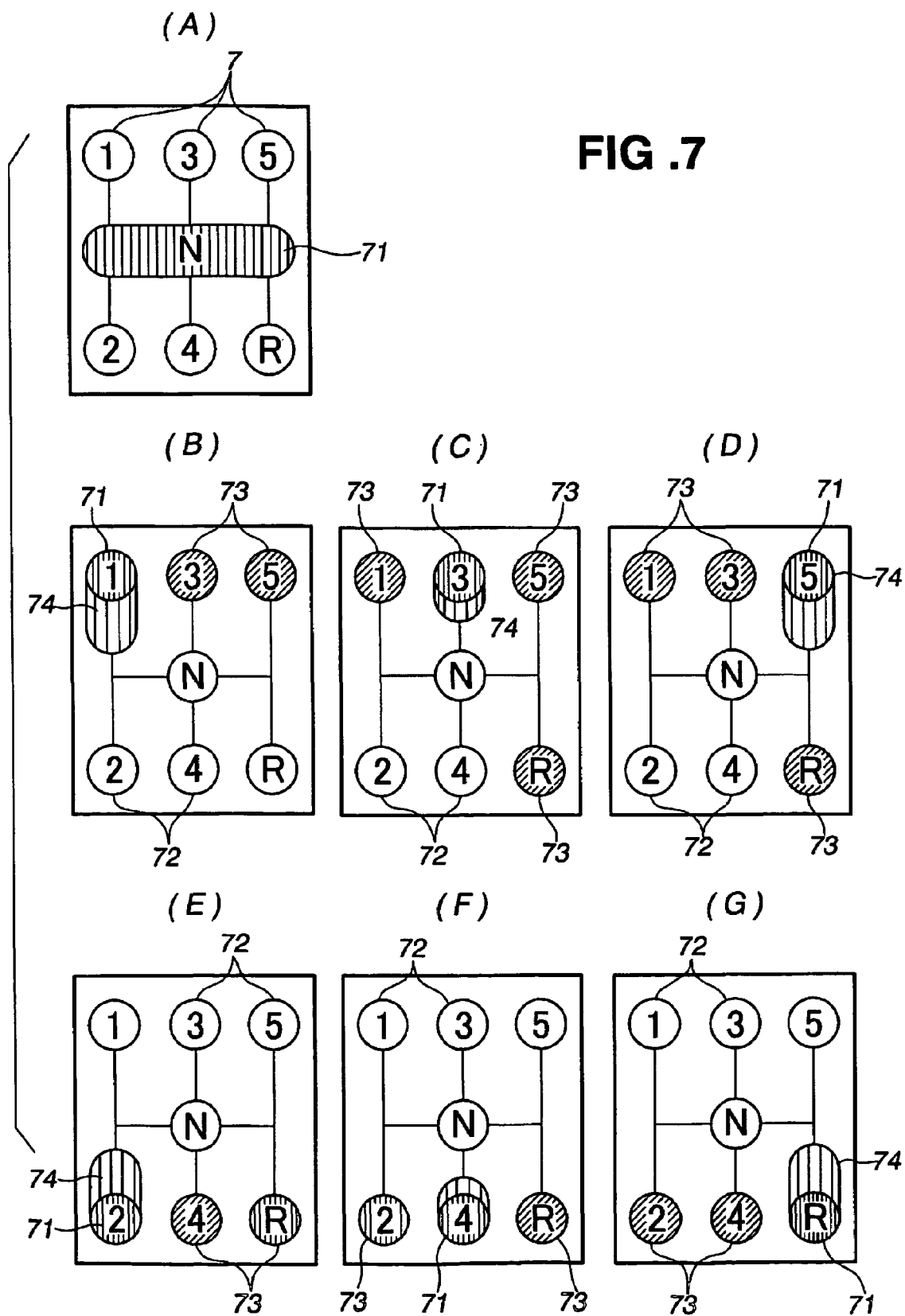
FIG. 7 is a view explanatory of shift patterns employed in another embodiment of the present invention.

FIG. 7 shows other example shift patterns which are also provided as line patterns 15 displayed on the operation panel visualized on the monitor 12. The line patterns 15 of FIG. 7 are also set appropriately by the reactive force control section 41 of the control device 26 in accordance with a predetermined condition.

In each of the six shift patterns shown in (A)-(G) of FIG. 7, each circled area with vertical lines 71 represents a current position of the shift lever and ultimately-determined area (generating a signal), while each white circled area 72 represents a shift position to which the shift lever 13 can be shifted, and each circled area with hatched lines 73 represents a removed shift position. Further, each oblong area with vertical lines 74 represents a positional area to be used for determination or judgment when a load pattern is to be switched.

The constructions, shapes, sizes and positional relationships explained above in relation to the embodiments are shown just schematically, and numerical values and compositions (materials) of various constituent parts are just illustrative. Therefore, it should be appreciated that the present invention is not limited to the above-described embodiments and may be modified variously as long as it does not depart from the basic technical concepts set forth in the claims.

INDUSTRIAL APPLICABILITY

The present invention is advantageously applicable to a manual transmission control apparatus for vehicles, such as passenger cars, for imparting virtual forces to the transmission shift lever, so as to haptically provide shift paths for the shift lever and thereby enhance the operability, changeability and flexibility of an H-shaped shift pattern.

The invention claimed is:

1. A vehicular manual transmission control apparatus comprising:
   a setting means for, when a shift pattern of a transmission shift lever has at least one shift position, setting prioritized shift paths and non-prioritized shift paths of the shift pattern on the basis of a travel control state of a vehicle; and
   a guide means for, when the shift lever is to be shifted to a desired position in the shift pattern having two or more shift positions, permitting a shift operation of the shift lever along the prioritized shift paths and restricting operation of the shift lever alone non-prioritized shift paths.

2. The vehicular manual transmission control apparatus according to claim 1, wherein the guide means is implemented by a reactive force generation mechanism which, in turn, is implemented by a control device.

3. The vehicular manual transmission control apparatus according to claim 1, wherein the guide means functions as gates for defining shift paths, and wherein a given roundedness is provided along a given corner portion of a shift-path bifurcation area leading toward a particular shift path to which the shift lever is to be shifted.

4. The vehicular manual transmission control apparatus according to claim 3, wherein the travel control state of the vehicle is a shift position of the shift lever.

5. The vehicular manual transmission control apparatus according to claim 3, wherein the travel control state of the vehicle is a velocity of the vehicle.

6. The vehicular manual transmission control apparatus according to claim 1, wherein the guide means is in the form of a reactive force element that permits or restricts shifting of the shift lever when the shift lever is to be shifted.

7. The vehicular manual transmission control apparatus according to claim 6, wherein the guide means is implemented by a reactive force generation mechanism which, in turn, is implemented by a control device.

8. The vehicular manual transmission control apparatus according to claim 6, wherein the travel control state of the vehicle is a shift position of the shift lever.

9. The vehicular manual transmission control apparatus according to claim 8, wherein the guide means is implemented by a reactive force generation mechanism which, in turn, is implemented by a control device.

10. The vehicular manual transmission control apparatus according to claim 6, wherein the travel control state of the vehicle is a velocity of the vehicle.

11. The vehicular manual transmission control apparatus according to claim 10, wherein the guide means is implemented by a reactive force generation mechanism which, in turn, is implemented by a control device.

12. The vehicular manual transmission control apparatus according to claim 1, wherein the travel control state of the vehicle is a shift position of the shift lever.

13. The vehicular manual transmission control apparatus according to claim 12, wherein the guide means is implemented by a reactive force generation mechanism which, in turn, is implemented by a control device.

14. The vehicular manual transmission control apparatus according to claim 1, wherein the travel control state of the vehicle is a velocity of the vehicle.

15. The vehicular manual transmission control apparatus according to claim 14, wherein the guide means is implemented by a reactive force generation mechanism which, in turn, is implemented by a control device.

* * * * *